US008205499B2

(12) United States Patent
Gregg et al.

(10) Patent No.: US 8,205,499 B2
(45) Date of Patent: Jun. 26, 2012

(54) METHOD AND APPARATUS FOR CHECKING AN ACOUSTIC TEST FIXTURE

(75) Inventors: Justin Gregg, San Francisco, CA (US); Michael M. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1160 days.

(21) Appl. No.: 11/961,666

(22) Filed: Dec. 20, 2007

(65) Prior Publication Data

US 2009/0158849 A1 Jun. 25, 2009

(51) Int. Cl.
*G01N 29/04* (2006.01)
*G01N 29/00* (2006.01)

(52) U.S. Cl. .......................................................... 73/584

(58) Field of Classification Search ........................ None
See application file for complete search history.

(56) References Cited

U.S. PATENT DOCUMENTS

2008/0049147 A1* 2/2008 Ho ................................ 348/734

* cited by examiner

*Primary Examiner* — Benjamin Sandvik
*Assistant Examiner* — Whitney T Moore
(74) *Attorney, Agent, or Firm* — Blakely, Sokoloff, Taylor & Zafman LLP

(57) ABSTRACT

A body has a first portion whose exterior surface is similar to that of a corresponding, first portion of a portable media device. An acoustic aperture is formed at a location that is similar to that of a built-in earpiece, speaker, or microphone aperture in the media device. An acoustic port is formed in the exterior surface of the body, and is adapted to be coupled to a sound test tool. An internal cavity acoustically couples the acoustic port to the acoustic aperture. Other embodiments are also described and claimed.

11 Claims, 8 Drawing Sheets

METHOD AND APPARATUS FOR CHECKING AN ACOUSTIC TEST FIXTURE

An embodiment of the invention is directed to a technique for checking or verifying the acoustic capability of a test fixture that is to be used for acoustics testing of a portable media device.

BACKGROUND

More than even before, consumers are enjoying the convenience of listening to music, watching a video, or simply carrying on a telephone conversation using portable digital media devices. Devices such as consumer grade cellular telephone handsets, palm-sized or laptop computers with wireless data networking capability, and handheld digital media players such as MP3 and DVD players, are delivering ever improving sound quality to their users.

To verify the performance of a cellular telephone handset, including the acoustic capabilities of its built-in receiver (also referred to here as earpiece), a manufacturer typically builds or purchases a test fixture for testing the audio and radio frequency (RF) functionalities of the handset. Reliable test results can be ensured by first calibrating the test fixture prior to using it for testing a device.

An acoustic measurement system or test fixture has a microphone that needs to be calibrated prior to use. Typically, the microphone is first removed from the system, and then calibrated outside the system. A reference acoustic pressure source is attached to the microphone, and then the signal produced by the microphone is measured. The measurement is stored as a reference value associated with the particular microphone, and a related electronic circuit (or microphone reading) may then be adjusted accordingly for future readings, to obtain the calibrated response from the microphone. The microphone is then installed back into the measurement system with the expectation that the system is now ready to reliably test the media devices.

SUMMARY

An embodiment of the invention is a device for checking an acoustic test fixture (also referred to as an acoustic test fixture calibrator or calibration device). The calibrator device fits into the test fixture in the same manner a unit-under-test would fit. An acoustic port is formed in the exterior surface of the calibrator device's body. The acoustic port is adapted to be coupled to an acoustic input or output port of a sound test tool. The body has an internal cavity that acoustically couples the acoustic port to an acoustic aperture in the exterior surface. The acoustic aperture is positioned and otherwise adapted to mimic a corresponding aperture (e.g., a receiver aperture) on a unit-under-test. Other embodiments are also described.

The calibration procedure described in the Background section above may account for microphone-to-microphone sensitivity variations (i.e., different microphones in a given set may have substantially different sensitivities), and microphone sensitivity degradation over time. However, it cannot account for variations in the installation of the microphone in a test fixture. For example, there may be manufacturing variations, among otherwise identical manufactured test fixtures, in the distance between the microphone and the installed device under test (unit-under-test), or in leakage or other acoustic losses. In accordance with an embodiment of the invention, accurate measurements may be more likely across many test fixtures, by calibrating the microphone while it is installed in the test fixture, rather than first removing it from the test fixture. Additionally, a further advantage may be obtained by moving the "calibration reference" from the microphone plane to the plane of the acoustic output aperture of the unit-under-test. Doing so allows for acoustic pressure measurements, obtained from different test fixtures and microphones, to be accurately and reliably compared.

Use of the calibrator devices described here avoids the need to maintain several equal "golden" media devices, for the calibration of test fixtures that have been produced or are being used in different manufacturing plants. The calibrator devices are easier to manufacture than the media devices, and it is easier to ensure that all of them are equal in terms of physical dimensions.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

I. Overview

An embodiment of the invention is described here in the following sections, using an example portable media device, an example acoustic test fixture, and a corresponding acoustic test fixture calibrator.

Figure 6:
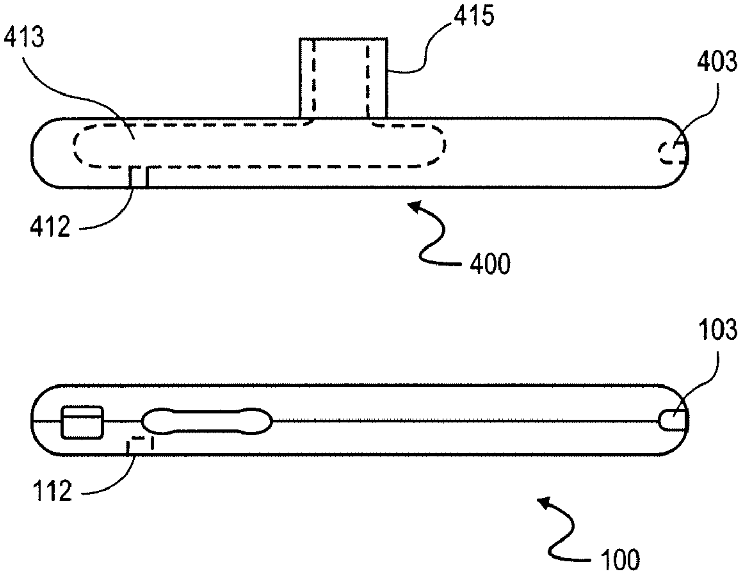
FIG. 6 shows side views of the DUT and its corresponding, test fixture calibrator.
Figure 7:
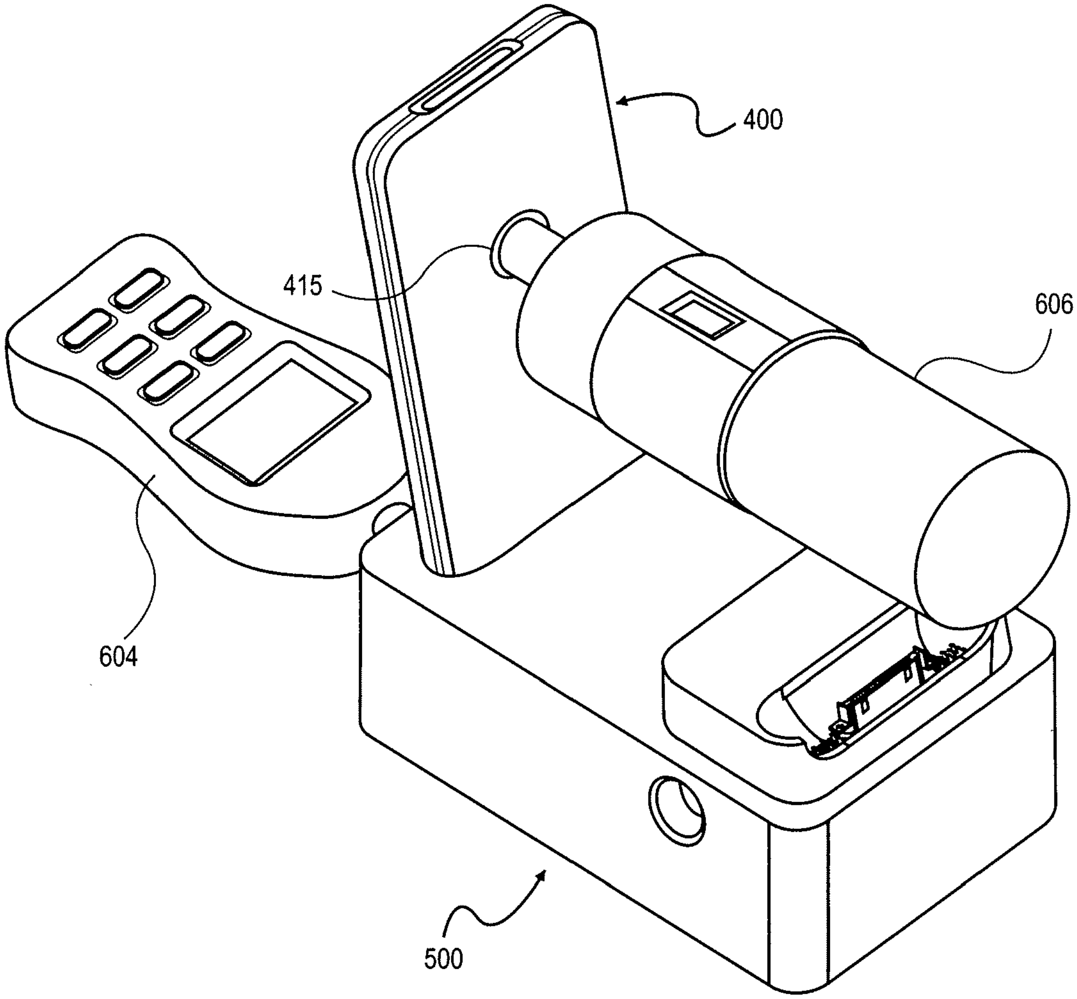
FIG. 7 shows the test fixture calibrator in use, while checking the acoustic test fixture, using an example sound pressure level (SPL) meter and an example reference sound source.

First, an example portable media device 100 to be tested (DUT, or simply media device 100) is described in connection with FIG. 1. Next, a description of an example acoustic test fixture 500, depicted in FIG. 2, is given. Its use for acoustics testing of the example media device is then described in connection with FIG. 3 and FIG. 4. Note that these are only examples of test fixture and a DUT—the invention is also applicable to other acoustic test fixture designs and other DUT designs. In the next section, a test fixture calibrator in accordance with an embodiment of the invention is described together with its different views in FIG. 5 and FIG. 6. FIG. 7 shows an embodiment of a calibrator in use, that corresponds to the DUT shown in FIG. 1. The calibrator description then continues with another example calibrator, depicted in FIG. 8. Lastly, a flow for a process of checking an acoustic test fixture, using the calibrator, is given in FIG. 9.

II. Example Portable Media Device (DUT)

Figure 1:
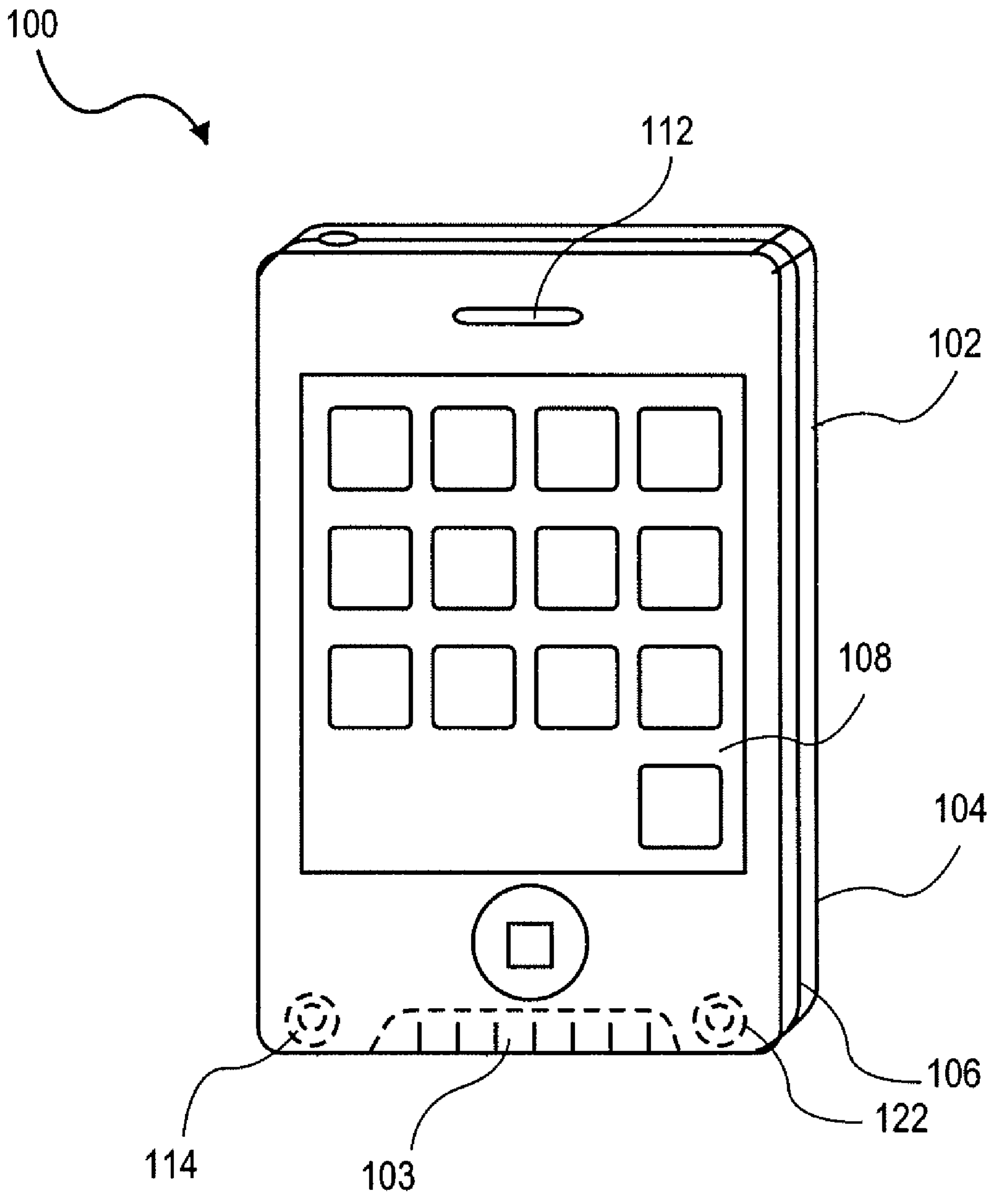
FIG. 1 is an elevation view of an example portable media device.
Figure 2:
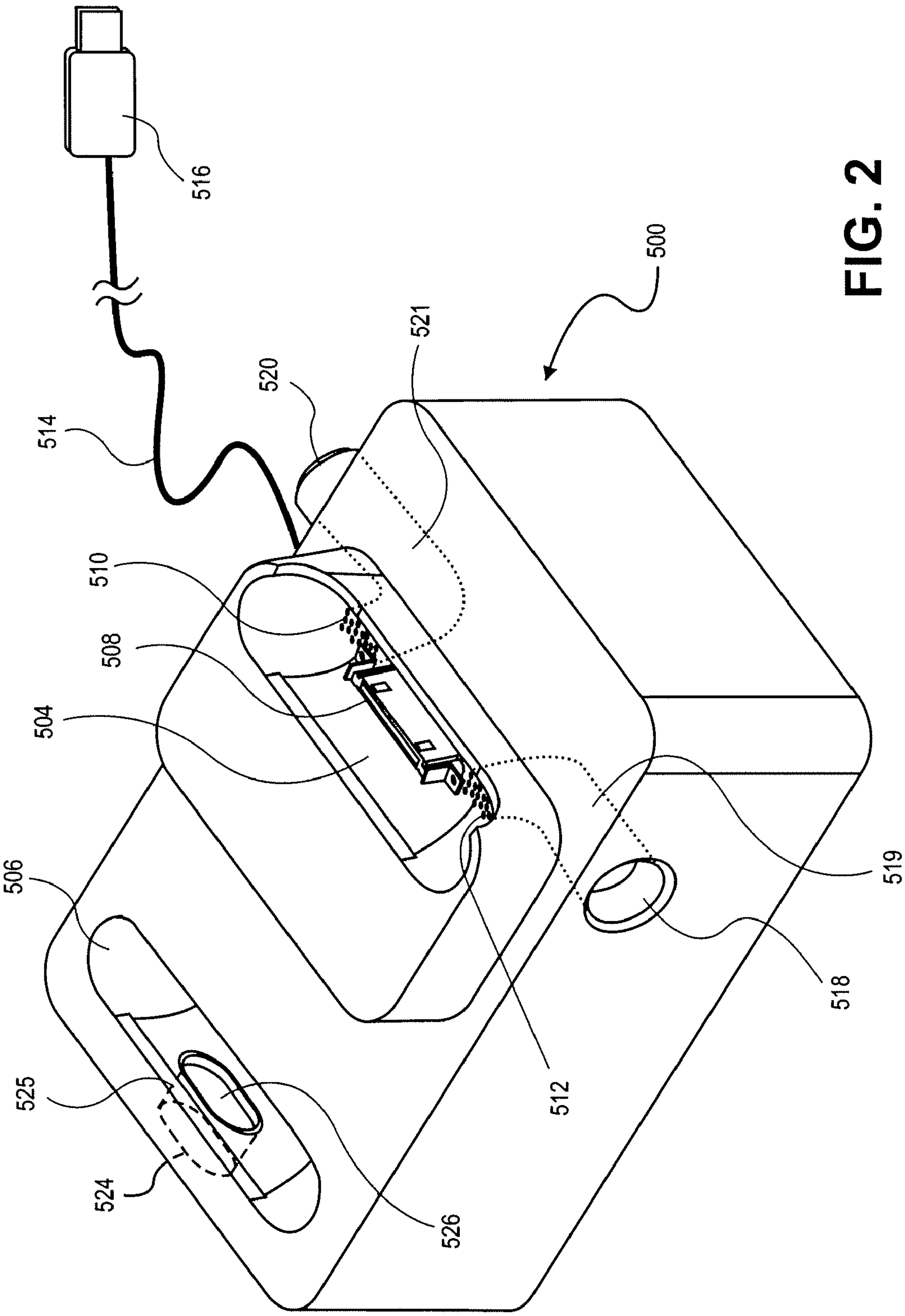
FIG. 2 is an elevation view of an example acoustic test fixture for an example portable media device.

Referring now to FIG. 1, a perspective view of a media device 100 is shown. The device 100 can be detachably mounted to or interfaced with a test fixture 500 (see FIG. 2). A housing 102 includes a speaker housing acoustic aperture 122 that may be located in proximity to a lower portion of the media device 100 (referred to here as the bottom end). The bottom end may also contain a microphone, with associated microphone acoustic aperture 114 in the housing 102. In certain embodiments, the microphone aperture 114 and/or the speaker aperture 122 may be located on a bottom face 124 of the media device 100. More generally, the microphone aperture 114 and the speaker aperture 122 may be located on any other portion of the housing 102 that can facilitate the delivery and reception of sound in the manner in which the device 100 is intended to be used.

In one embodiment, the housing 102 includes a first housing portion 104 and a second housing portion 106 that are fastened together to encase various electronic components of the media device 100. The housing 102 may be made of polymer-based materials that are formed by, for instance, injection molding to define the form factor of the media device 100. The housing 102 may surround and/or support internal components, such as circuit boards having integrated circuit components, internal radio frequency circuitry, an internal antenna, a speaker, a microphone, a receiver (earpiece), nonvolatile mass storage such as nonvolatile solid state memory and/or a magnetic rotating disk drive, as well as other components. The housing 102 also provides for the mounting of a built-in display 108, a separate keypad (not shown), an earphone jack 116, and a battery charging jack (not shown). As an alternative to the separate keypad, FIG. 1 shows a device that has a single touch sensitive display 108 that spans most of the area on the front face of the device 100, for both showing information to the user, as well as accepting input by the user. In this particular embodiment, the device 100 can be used a telephony handset, where receiver/aperture 112 is positioned at the top end of the device 100 as shown, to facilitate such use of the device.

The media device 100 may include a wireless communications function, such as cellular or satellite telephony, pager, portable laptop/notebook computer, or other wireless communications function. The media device 100 may be, for example, an iPod or iPhone media device, or a palm sized personal computer such as an iPAQ Pocket PC available from Hewlett Packard, Inc., of Palo Alto, Calif. In some embodiments, the media device may synchronize with a remote computing system or server, to receive media using either a wireless or wireline communication path. Media may include sound or audio files, music, video, and other digital data, in either streaming and/or discrete (e.g., files) formats. The media device 100 may also have a wireline communication connector 103, e.g. a 30-pin connector, that may be located on the bottom face of the device 100. This can be used to directly connect (e.g., dock) the device 100 to another computer (also referred to as a docking connector). During synchronization, a host system (e.g., the computer that is directly connected by the wireline communication connector 103) may provide media to a client software application embedded within the media device 100. The media and/or data may be downloaded into the media device 100, or the media device 100 may upload media to the remote host or another client system.

The primary functional blocks of the media device 100 may include the following built-in components. A processor may control the operation of many functions and other circuitry in the media device 100. The processor may, for example, drive the display 108 and may receive user inputs through a user interface (which may include a single, touch sensitive display panel on the front face of the device 100 and circuitry to interface the microphone, speaker, and receiver). Data storage may be comprised of nonvolatile solid state memory and/or a kinetic nonvolatile storage device (e.g., rotating magnetic disk drive) that stores the different media (e.g., music and video files, functional software, preference information, e.g., for media playback, transaction information, e.g., information such as credit card information and other user authentication information, and wireless connection information, e.g., information that may enable the media device to establish wireless communication with another device).

In addition to the data storage, there may be memory, also referred to as main memory or program memory, to store code and data being executed by the processor. The memory may be comprised of solid state random access memory. A bus provides a data transfer path between the memory, storage and the processor. In addition, the bus may also allow communications with a coder/decoder (codec), which is a specialized circuit that converts a digital audio signal into an analog signal for driving the speaker and/or the receiver. This is designed to produce sound, including voice, music and other like audio. The codec may also convert sound detected by the microphone into digital audio signals for storage and digital processing by the processor.

The media device 100 also includes communications circuitry for external, wireless and wireline communications. For example, the communications circuitry may implement Wi-Fi links according to IEEE 802.11 industry standards. The communications circuitry may also include wireline network interface controllers (e.g., an Ethernet interface). These allow the media device 100 to appear and be accessed as an end node in the Internet.

The communications circuitry may also implement wireless communications in accordance with standards such as Bluetooth, Global System for Mobile Communications (GSM) and/or code division multiple access (CDMA) wireless protocols. These may also allow the media device to function as a conventional cellular telephony handset, allowing its user to make and receive wireless phone calls.

In addition, the communications circuitry may also include a direct point-to-point interface to another computer or accessory device, such as in accordance with a computer peripheral bus standard (e.g., USB), or via a 30-pin docking connector.

All of the above functionality may be integrated within a single housing which makes the media device 100 a portable computing device that is battery or fuel cell operated and is palm sized. In other embodiments, however, the media device 100 may be somewhat larger than palm size, e.g. a laptop or notebook computer, yet nevertheless, it is still considered a personal, consumer grade, stand alone mobile computing or media processing device.

The primary functional blocks have been described mostly in terms of hardware components. However, there are also several software components that control and manage, at a higher level, the different functions of the media device 100. There may be at least two layers of user software in the media device. During the life cycle of the media device, one or more of these software components may be updated to either fix errors or enhance functionality. These user software components include an operating system, and several applications that may run on top of the operating system. Both the operating system and the applications may be residing in main memory while being executed by the processor. Other architectures for software and the underlying hardware that will execute it are possible, e.g. a processor that is cell based with multiple cell-type processing units in a data driven architecture.

In most instances, the operating system is typically the first user level software that will be executed after any embedded, power on self-test routines are performed by the media device 100. After the operating system has booted, one or more applications may be automatically or manually (through user command) launched, to implement the different high level functions of the media device 100. For instance, there may be a cellular telephone application that configures a built-in touch sensitive display to look like the keypad of a telephony handset, and allows the user to enter a telephone number to be called, or select a previously stored number from a telephone address book. The cellular application may register the media device as a cellular handset with the nearest cellular base station (using the appropriate cellular communications protocols built into the media device). The application then proceeds to allow the user to make a call, and controls the built-in microphone and receiver to enable the user to experience a two-way conversation during the cellular phone call.

Another application may be a browser application that allows the user to surf the Web on the built-in display and speaker, using, for example, the Wireless Access Protocol over a GSM or Wi-Fi wireless link.

Still another application may be a media player application, such as an MP3 audio player. This would allow the user to select songs as MP3 files that have been downloaded into the media device 100, for playback through the built-in speaker or earphone jack.

Yet another one of the applications may be an acoustics test application that allows the user to command an audio test signal be generated in the device 100 and emitted through the speaker or receiver, while simultaneously displaying the spectral and/or sound level characteristics of this generated audio test signal, i.e. its expected spectral content and/or sound level. These may be measured by an external SPL meter, for instance, from the acoustic output of the built-in speaker or receiver. In addition, the acoustic test application may be designed to perform digital processing on an audio test signal sensed by the built-in microphone, and then to show the measured spectral content and/or sound level on the built-in display of the device 100. During development of the acoustic test application, a "known good [media] device" may be used to verify that the test application is, in fact, measuring (calculating) correctly the output of the built-in microphone, in the presence of a known and calibrated audio test signal. Similarly, during development of the receiver and speaker test portions of the test application, the software may be evaluated on a known good [media] device to ensure that it can calculate and deliver to the speaker or receiver the desired audio test signal that is to be emitted by the speaker or receiver. Other types of acoustics test applications are possible.

III. Example Acoustic Test Fixture

Having described an example portable media device 100 to be tested, we now turn to the test fixture. FIG. 2 is a plan view of a test fixture 500 that is suitable for acoustics testing of a palm-sized, portable media device, such as the iPhone device by Apple, Inc., of Cupertino, Calif. However, the concepts below also apply to acoustic test fixtures for other types of consumer grade, portable media devices including cellular telephone handsets, laptop computers, and digital media players, such as the iPod device by Apple, Inc. In this embodiment, the test fixture 500 is a portable, handheld unit whose flat bottom allows it to rest stably on a horizontal surface of a countertop during testing. Note, however, the concepts here equally apply to larger, more complex acoustic test fixtures. The fixture 500 in this case is also adapted to act as a docking station to the portable media device under test (DUT, or simply media device), by being connected to another computer via a communication cord 514. As an alternative, this docking connection may be a wireless one. The test fixture 500 in general, may include a platform, support structure, or device holding mechanism, to enable convenient and efficient positioning and acoustic interfacing of the media device with stand alone, sound test tools. In addition, the test fixture may be designed to interface with the media device in a functionally more efficient or aesthetically pleasing position. For example, the test fixture may secure the media device in a position that allows persons who are running or observing the testing to easily read the display of the media device during the various acoustic tests described here, and not obstruct the display during the acoustic tests, while simultaneously supplying efficient acoustic channels or pathways that couple the sound test tools to the respective acoustic apertures on the surface of the installed media device.

Still referring to FIG. 2, the plan view is of an example test fixture 500 that is suitable for a media device with aspects that are similar to those of the iPhone media device. In this case, there is a first hollow or cavity 504 and a second hollow or cavity 506 formed on the top surface of the fixture 500. These act as holsters for the media device. To test its speaker and/or microphone, the media device is installed by being lowered into the first hollow 504, bottom end first, until it is resting against the top surface of the fixture 500 inside the hollow. The first hollow is shaped to generally conform to the bottom end of the media device so as to loosely hold the device substantially upright as shown, i.e. essentially perpendicular or slightly angled. The first hollow is defined in part by a lower, substantially horizontal surface in which are formed one or more acoustic apertures 510. These may be formed near one end of the hollow 504, at a location that is aligned with one or more acoustic apertures of the installed device that are associated with a built-in microphone, to form part of an internal acoustic pathway 521 through which an acoustic test signal is to travel from inside a body of the test fixture 500 into the microphone inside the media device.

In addition to a microphone, the bottom end of the media device may also have a built-in speaker. In such an embodiment, the lower horizontal surface that in part defines the first hollow 504 has also formed therein one or more further acoustic apertures 512 at another end. These are at a location that is aligned with one or more acoustic apertures of the installed device 100 that are associated with the speaker, to form part of an acoustic pathway 519 through which an acoustic test signal will travel from the speaker inside the device 100 into the base or body of the test fixture.

In this embodiment, the first hollow 504 also has a further opening in the lower horizontal surface, between the apertures 512, 510 as shown, through which a docking connector 508 extends from inside the body of the test fixture 400. The docking connector 508 mates with another one, which is built into the bottom face of the media device. The docking connector 508 is connected to one end of a communication cable 514 whose other end has a further connector 516 connected to it. The latter mates with another connector that is built into a computer (not shown).

The test fixture also has a second hollow 506 formed on its top surface, also acting as a holster for the device. The device is installed by being lowered into the second hollow, this time top end first, until it is resting against the lower horizontal surface of the fixture within the second hollow. The second hollow 506 is shaped to generally conform to the top end of the device 100 so as to loosely hold the device upside down, substantially upright as shown, i.e. essentially perpendicular or slightly angled. The second hollow is defined in part by its lower horizontal surface in which are formed one or more acoustic apertures 526. These may be formed near the middle of the hollow as shown, at a location that is aligned with one or more further acoustic apertures of the installed device 100 that are associated with a receiver (also referred to as an earpiece that, in one embodiment, may only be used for telephony audio), to form part of an acoustic pathway 525 through which an acoustic test signal is to travel from the receiver into the body or base of the test fixture.

The test fixture also has a number of acoustic test ports. There is a microphone port 520, located in this example on one external side of the test fixture body, which may be a hole in the surface of the body that extends into the body and communicates with the acoustic pathway 521 through which the test signal is to travel into the microphone inside the device 100. In the particular example shown, the hole is ported through an otherwise solid portion of the body, all the way to the acoustic apertures 510 of the first hollow (that line up with those of the device built-in microphone). An off the shelf reference sound pressure source 606 may be used to generate the test signal. The reference sound source 606 may have a sound output port that simply slides onto a tube that extends outward from the hole of the microphone port 520.

The test fixture 500 also has a speaker port 518, located in this example on another external side of the test fixture body. The speaker port 518 may also be a hole (in the surface of the body) that extends into the body and communicates with the acoustic pathway 519 through which the test signal is to travel from the device's built-in speaker. In the particular example shown, the hole is ported through an otherwise solid portion of the body, all the way to the acoustic aperture 512 of the first hollow 504 that line up with those of the device built-in speaker. An off the shelf sound pressure level, SPL, meter 604 may be used to measure the audio test signal. The SPL meter may have a sound input port that includes a tube, which simply slides into the hole of the speaker port 518.

The test fixture 500 also has a receiver port 524, located in this example on another external side of the test fixture body. The receiver port 524 may also be a hole (in the surface of the body) that extends into the body and communicates with the acoustic pathway 525 through which the test signal is to travel from the device's built-in receiver. In the particular example shown, the hole is ported through an otherwise solid portion of the body, all the way to the acoustic aperture 526 of the second hollow 506 that line up with those of the device built-in receiver. An off the shelf sound pressure level, SPL, meter 604 may be used to measure the audio test signal. The SPL meter has a sound input port that includes a tube, which slides into the hole of the receiver port 524. Both the reference sound source and SPL meter may be easily removed from their ports by a user, so that they can be re-used with other test fixtures in the retail store.

Note that in the example embodiment of FIG. 2, each of acoustic pathways 519, 521, and 525 are acoustically isolated from each other, e.g. by virtue of the acoustic barrier effect of the material that makes up the otherwise solid body in which the pathways 519, 521, and 525 have been formed.

In another embodiment, the test fixture 500 also has (embedded in its body) an earphone/headphone connector (e.g., a jack plug) which mates with an earphone connector of the media device. This is used for testing the earphone signal that is generated by the media device.

In addition to the test fixture 500, one or more sound tools may also be part of the overall acoustics test system. The sound tools may include an off the shelf sound pressure level, SPL, meter 604 (see FIG. 3), and an off the shelf reference sound pressure source 606 (see FIG. 7). The latter emits an acoustic test signal, e.g. one or more tones, having a defined spectrum and power level, that is typically identified visibly on the outside of the reference sound pressure source's housing (e.g., "1 KHz at 114 dB-SPL"). The SPL meter 604 may have a digital display that indicates certain parameters of the measured sound, e.g. in frequency and dB-SPL, at its input port.

Figure 3:
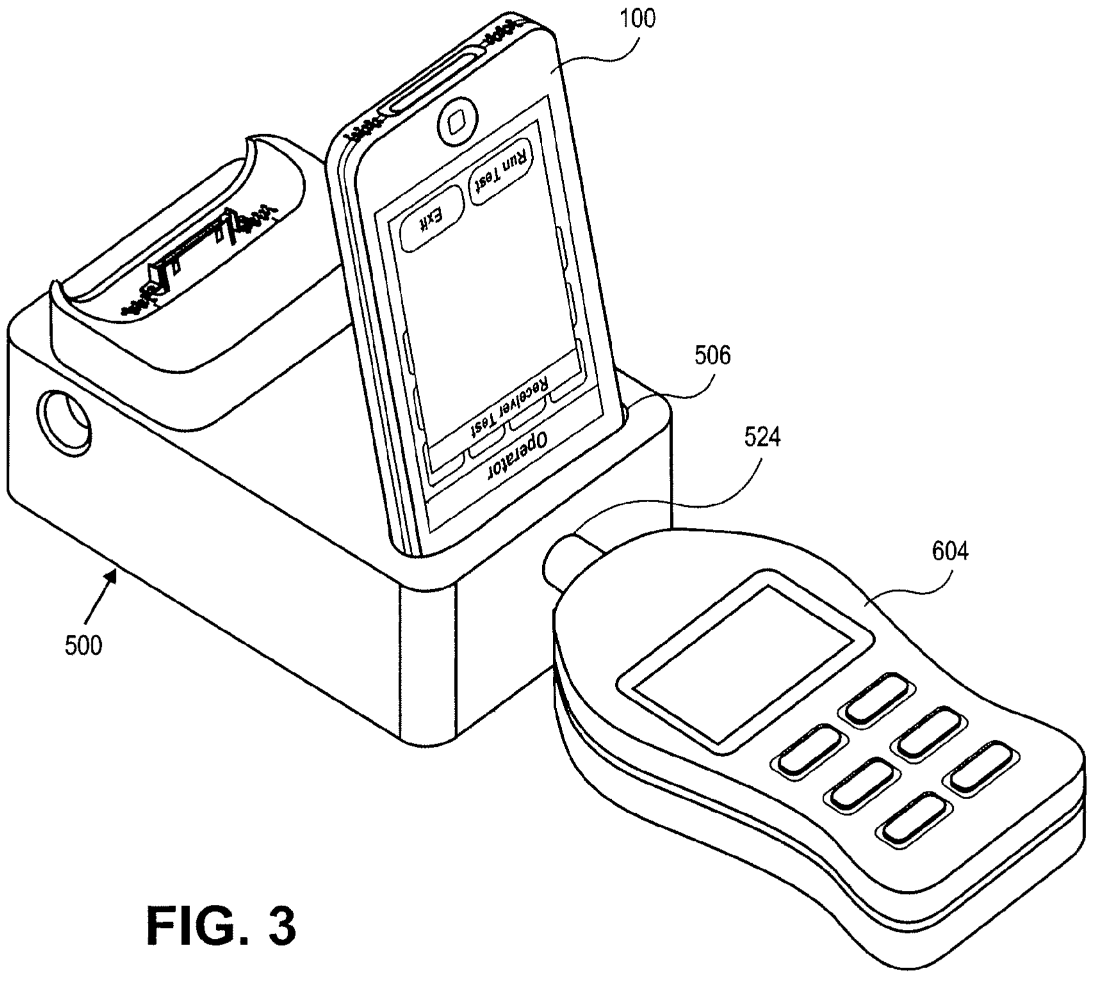
FIG. 3 shows the test fixture in use, while a receiver acoustic test is being performed on an example media device under test (DUT).

FIG. 3 shows the fixture 500 in use, during an example, receiver test. Note that the device 100 has been inserted upside down, into the second hollow 506 of the test fixture 500. In this example, the receiver test only calls for the SPL meter 604 to be connected to the receiver port 524 as shown (the reference sound source 606 need not be connected to the test fixture 500 during this test). The test signal emitted by the built-in receiver of the device 100 may also be generated by the test application running in the device 100. The test application causes the display of the device 100 to show the characteristics of the generated test signal (e.g., as spectral and sound level ranges) during the test. These can be readily compared by the user, to what is shown on the digital display of the SPL meter 604 as being detected at the receiver port 524.

Figure 4:
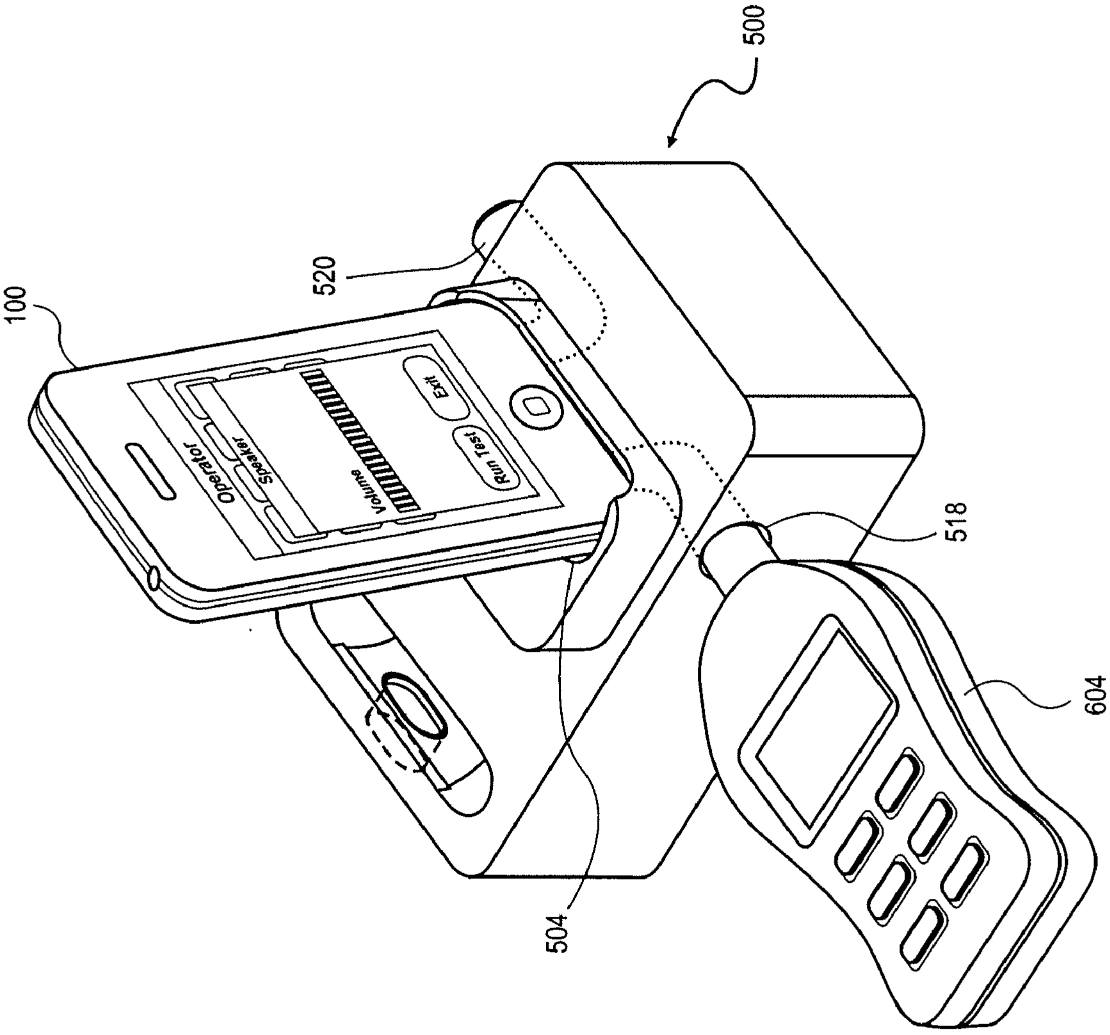
FIG. 4 shows the test fixture in use, while a speaker acoustic test is being performed on the DUT.

FIG. 4 shows the fixture 500 in use, during an example, speaker test. The speaker test in this case only calls for the SPL meter 604 to be connected as shown (the reference sound source 606 need not be connected). The test signal emitted by the built-in speaker of the device 100 may be generated by the test application running in the device 100. The test application causes the display of the device 100 to show the characteristics of the generated test signal (e.g., as part of spectral and sound level ranges). These can be readily compared by the user, to what is shown on the digital display of the SPL meter as being detected at the speaker port 518.

IV. Example Acoustic Test Fixture Calibrator

Figure 5:
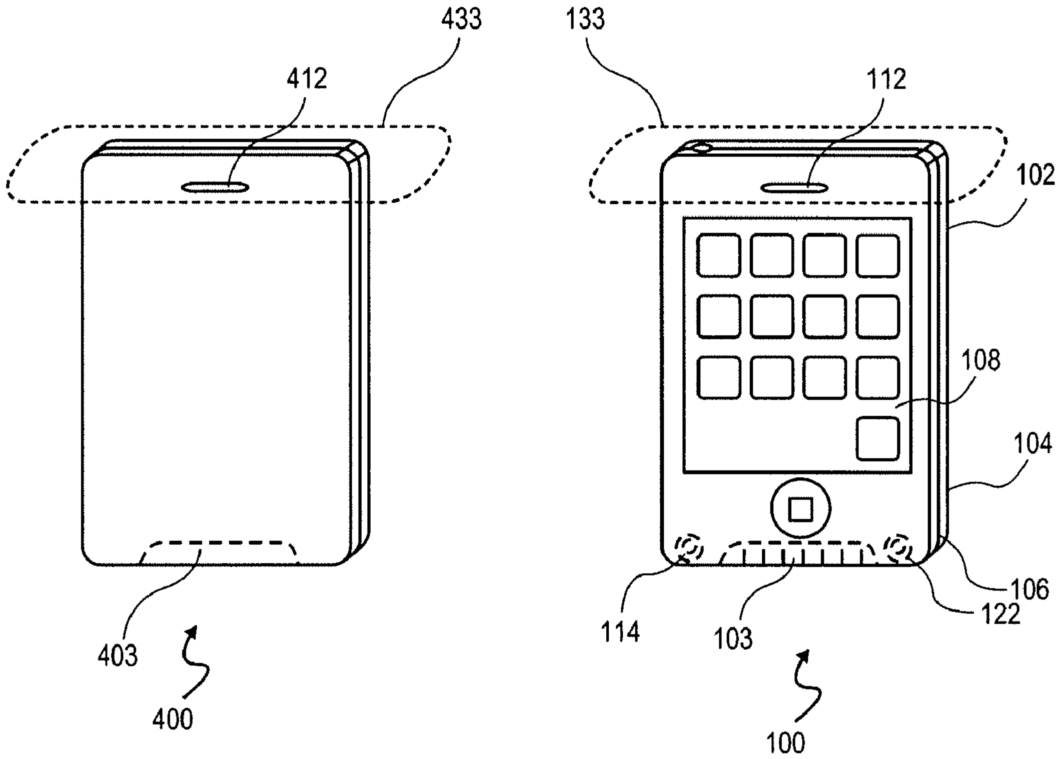
FIG. 5 shows front views of the DUT and its corresponding, test fixture calibrator.

Turning now to FIG. 5, an elevation view of an example test fixture calibrator device 400 is shown. The calibrator device 400 is shown next to its corresponding media device 100 (to be tested). As explained below, use of the calibrator 400 to check the test fixture allows the "plane of reference" for calibrating the test fixture to be, for instance, the output of the receiver of the media device 100, at the aperture 112. This helps better identify those manufactured test fixtures that are non-conforming.

The body of the calibrator device 400 has a first portion 433 whose exterior surface has shape and dimensions that are similar to those of the exterior surface of a corresponding portion of the media device 100. Thus, in the example here, the first portion 133 of the media device 100 is the region above the top edge of the display 108. A corresponding portion 433 of the calibrator device 400 is shown. In addition, a receiver acoustic aperture 112 is formed in the exterior surface of the first portion 133, in this example centered on the front face of the first portion 133. Similarly, the portion 433 of the calibrator has an acoustic aperture 412 formed on its front face, and is located (relative to the periphery of the portion 433) similarly as the receiver aperture 112 (relative to the periphery of the portion 133). Note that the shape of the aperture 412 and its location need not be exactly the same as the corresponding aperture 112. What is desired however is that the shape and location of the aperture 112, as well as the shape and dimensions of the calibrator device 100, be consistent across a number of copies of such calibrator devices, to ensure consistent acoustic performance across all copies.

In this particular example, the body of the calibrator device 400 also has a dummy connector 403 (also referred to as a DUT-like connector) built into its exterior surface, corresponding in shape, dimensions and location to the actual connector 103 of the media device 100. The dummy connector 403 is an alignment mechanism, rather than an actual communication connector, that helps better fit or key the calibrator device 400 to the test fixture 500, in the same manner as the media device 100. Again, the shape and dimensions of the dummy connector 403 need not be precisely the same as that of the actual connector 103. However, they should be consistent in each of the calibrator devices, to ensure equal acoustic performance between all copies of the calibrator device 400.

The body of the calibrator device 400 also has an acoustic port 415 formed in its exterior surface, shown in the side view of FIG. 5 in this example as extending out from the rear face of the calibrator device 400. The acoustic port 415 is adapted to be coupled to an acoustic input or output port of a sound test tool, such as the reference sound source 606 (see FIG. 7). The port 415 could be located elsewhere on the body, so long as a sound test tool can be easily coupled to it for checking the test fixture, and then decoupled once the test fixture has been checked.

The body also has an internal cavity 413 as shown that acoustically couples the port 415 to the aperture 412. The internal cavity 413 may be engineered in terms of shape, dimensions, and/or internal wall materials, so as to provide the needed acoustic coupling characteristics. The internal cavity 413 may consist of a set of simple, intersecting bores; one or more bores may have enlarged sections. Again, consistency in the construction of the internal cavity is important across all copies of the calibrator device 400.

The body of the calibrator device 400 may be precision manufactured in two pieces, namely a front face piece and a rear face piece, that are joined together along the side periphery as shown. Each piece may be machined out of a chunk of fairly rigid, acoustic barrier material, such as aluminum. One half of the internal cavity may be machined out of the inside face of each piece, so that the internal cavity is formed when the two pieces are joined together. The pieces may be joined together by a snap fit, bonding or other suitable mechanism. One or more bores may be drilled into a front wall (of the front face piece) to form the aperture 412. Similarly, one or more bores may be drilled into a rear wall (of the rear face piece) to form the port 415. A short extension tube may be threaded into or otherwise attached to the bore that is made in the rear face, to result in the particular shape of the port 415 shown in FIG. 6. Other ways of manufacturing the body of the calibrator device 400 are possible.

Turning now to FIG. 7, this is a diagram of the calibrator device 400 in use, while testing the receiver acoustic pathway of the test fixture 500. The output port of the reference sound pressure source 606 is connected to the port 415 of the device 400. The top portion of the device 400 has been inserted into the hollow 506 of the test fixture 500 (see FIG. 2). The input of the SPL meter 604 is connected to the port 524 of the test fixture 500 (see FIG. 2). The reference sound pressure source 606 is thus acoustically coupled, via the device 400 and the acoustic pathway 525, to the SPL meter 604 (see FIG. 2). The device 400, and in particular the aperture 412, mimics the receiver aperture 112 of the media device 100 that will be tested using the test fixture 500. This arrangement allows the measured, calibration microphone level (measured by the SPL meter), to be relative to a known, DUT acoustic output pressure while in the test fixture 500 (the latter being provided actually by the calibrator device 400, rather than an actual DUT). The measured calibration values may thus account for most if not all variations in the acoustic measurement system, including those from test fixture 500 manufacturing variations, device positioning, microphone angle, acoustic leaks and path losses, cable connector and back stop positioning and rotations, as well as microphone sensitivity.

Figure 8:
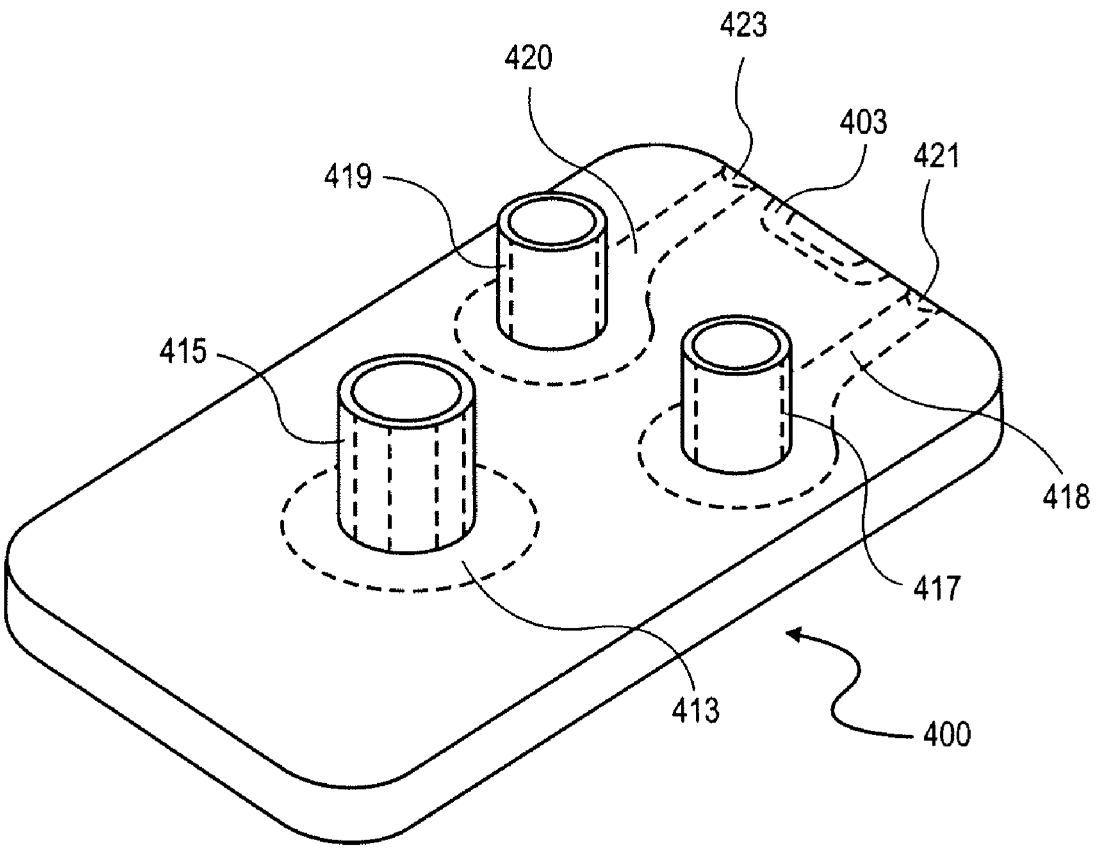
FIG. 8 shows an elevation view of another example test fixture calibrator.

The calibrator device 400 may have more than one acoustic port, so as to allow it to be used for checking or calibrating multiple measurement microphones on the test fixture 500. Referring now to FIG. 8, an elevation view of such a calibrator device 400 is shown. In this case, the device 400 has two additional acoustic ports 419 and 417 on the exterior surface of its body, each being adapted to be connected to a respective sound test tool. Port 419 in this example is adapted to be coupled to the reference sound pressure source 606, and is acoustically coupled via internal cavity 420 of the body, to an acoustic aperture 423. The latter is formed on the exterior surface of a different portion of the body of the device 400 (different than the first portion or top portion 412, see FIG. 5), namely one corresponding to the speaker aperture 122 in the media device 100 (see FIG. 1). Installing the calibrator device 400 into the test fixture 500 so that the aperture 423 is aligned with the aperture 512 (see FIG. 2), and attaching the sound reference source 606 to the port 419, may mimic the DUT (media device 100) producing a sound test signal that is acoustically coupled through the path 519 and out of the test fixture 500 into the attached SPL meter 604 at port 518.

As to port 417, it is adapted to be coupled to the SPL meter 604, and is acoustically coupled via internal cavity 418 of the body, to an acoustic aperture 421. The latter is formed on the exterior surface of a different portion of the body of the device 400 (different than portion 412 and the one in which the aperture 423 is formed), namely one corresponding to the microphone aperture 114 in the media device 100 (see FIG. 1). Installing the calibrator device 400 into the test fixture 500 so that the aperture 421 is aligned with the aperture 510 (see FIG. 2), and attaching the SPL meter 604 to the port 417, may mimic the DUT microphone (media device 100) receiving a sound test signal that is received into the test fixture 500 from port 520 and acoustically coupled through the path 521 and out of the test fixture 500 into the attached SPL meter 604.

Additionally, the acoustic ports and/or internal cavity of the calibrator device 400 may incorporate acoustic resistance by way of channel compression, foam, mesh, screen, or channel bends. Such acoustic resistance may facilitate the operation of the reference sound pressure source 606, by providing necessary back-pressure, and can match the acoustic path resistance of a real DUT. By adjusting the acoustic path resistance, the sound output level of the calibrator device 400 (e.g., out of the aperture 412) can be adjusted to more closely match that of the DUT (e.g., out of the receiver aperture 112).

Figure 9:
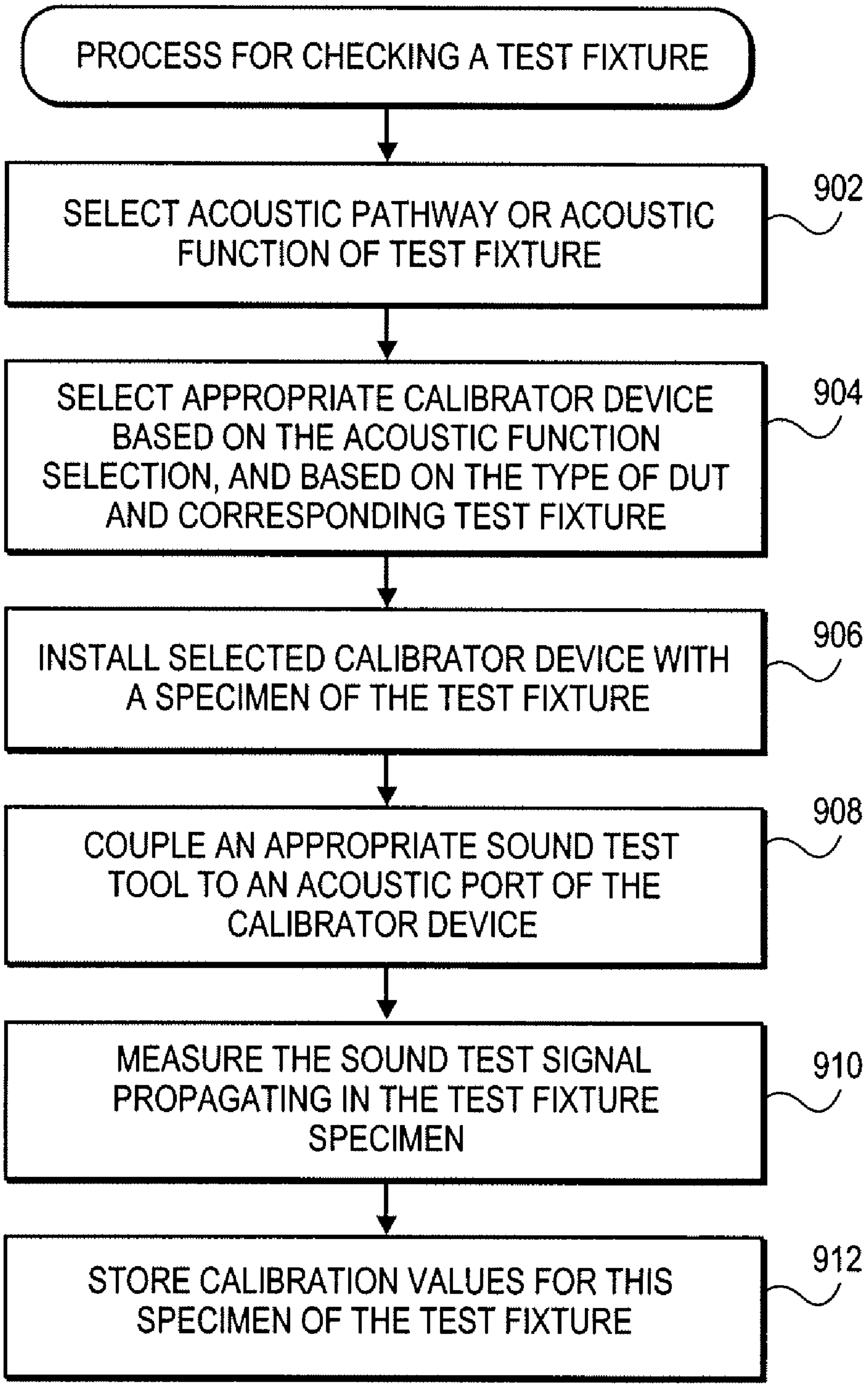
FIG. 9 is a flow diagram of a process for checking an acoustic test fixture.

FIG. 9 is a flow diagram of a process for checking a test fixture, such as the test fixture 500, using a calibrator device, such as the calibrator device 400, in accordance with an embodiment of the invention. The process described here may be repeated during the manufacturing of a number of such test fixtures, to for instance check each one of the manufactured specimens. The process begins with selecting one of possibly several acoustic pathways of the test fixture to verify (block 902). A calibrator device having a portion whose exterior shape and dimensions mimic those of a corresponding portion of the intended media device under test (DUT), is selected (block 904). That portion of the selected calibrator device fits with the test fixture, in the same way as the corresponding portion of the DUT would. This portion is one that is associated with the selected acoustic pathway to be checked. For instance, the DUT may have telephony capabilities, and as such the selected portion of the test fixture to verify may be the one corresponding to an end of the DUT in which a receiver aperture (earpiece aperture) is formed.

The selected calibrator device is then installed to the test fixture (block 906). Care should be taken that the calibrator device has been correctly fitted to the test fixture. If the fit is visibly off, then the test fixture may need to be re-worked or, depending on the nature of the defect in the test fixture, scrapped.

If the fit of the calibrator device is acceptable, then an acoustic input or acoustic output port of a sound test tool is coupled to an acoustic port of the calibrator device (block 908). The calibrator device has an internal cavity that acoustically couples the acoustic port to an acoustic aperture on its exterior surface. The latter is now aligned with an acoustic aperture of the test fixture (for acoustic coupling purposes). Thus, in the example here, the acoustic aperture of the calibrator device, which corresponds to the receiver aperture in the DUT, is aligned with the corresponding receiver testing aperture in the test fixture. In this case, to test the receiver pathway of the test fixture, the sound test tool that is coupled to the acoustic port of the calibrator device may be an off the shelf reference sound pressure source.

Once the coupled reference sound pressure source has been turned on and is emitting it's reference sound test signal, the sound test signal is propagating into the acoustic port and through the internal cavity of the calibrator device, and then out through the aperture of the calibrator device. The sound test signal is then propagating into the test fixture through the corresponding aperture. The test signal is then measured (block 910). This may be done in different ways. For instance, in the example test fixture 500 described above, the sound test signal may first propagate out of the body of the test fixture 500, before being detected in some form (e.g., by an SPL meter 604 that is coupled to an acoustic port in the body of the test fixture 500). The calibration values for this test fixture specimen are then noted or stored, e.g. the power and spectral characteristics of the sound test signal generated by the reference sound source 606, and the reading by the SPL meter 604 (block 912).

The above process operations in blocks 906-912 may be repeated, i.e. the same, selected calibrator device may be applied to a set of multiple specimens of the test fixture. These sound test signal measurements (for the set of two or more test fixtures) can then be compared and/or analyzed, and on that basis it is determined which ones of the test fixtures may need adjustments or should be scrapped altogether (the failing group), and which ones are consistent with one another or are close enough to a predetermined reading (the passing group). The passing group, and not the failing group, may then be used "as is" for actual, receiver testing of DUTs.

Although the above example process checks the acoustic performance of the test fixture as it relates to a built-in receiver (earpiece) of the media device 100, the concept is also applicable to check the acoustic performance of a test fixture associated with other acoustic functions of the media device, e.g. microphone and speaker. For test fixtures that can test more than one acoustic function (e.g., the test fixture 500 which can verify receiver, microphone and speaker functions of the DUT), a single calibrator device may be devised to verify those test fixtures with respect to all of the acoustic functions. In that case, a passing test fixture may be one for which the above process has been performed for each and every one of the different acoustic functions, and the test fixture has passed each and every one of the different acoustic function checks with the same calibrator device.

The invention is not limited to the specific embodiments described above. For example, the internal cavities 413, 418, and 420 in the body of the calibrator device 400 are depicted in FIG. 8 as being separate from each other. However, they may alternatively be open to each other, for example as part of a single contiguous internal cavity. They also need not have any enlarged sections as shown, but instead could be made of simple intersecting bores. Also, the above described use of the calibrator device 400 to check the particular test fixture 500 is just an example. The calibrator device 400 may in general be used to check other types of acoustic test fixtures that can be used for acoustics testing of the media device 100, including more complex test fixtures. Accordingly, other embodiments are within the scope of the claims.

What is claimed is:

1. A device for checking an acoustic test fixture, comprising:

a body having a first portion whose exterior surface (a) has shape and dimensions that are similar to those of the exterior surface of a first portion of a portable media device, and (b) has formed therein an acoustic aperture that is at a location, on the exterior surface, that is similar to one of a built-in earpiece, speaker, and microphone in the first portion of the portable media device, a second portion, different than the first portion, whose exterior surface (a) has shape and dimensions that are similar to those of the exterior surface of a second portion of the portable media device, and (b) has formed therein a further acoustic aperture similarly located to one of a built-in earpiece, speaker, and microphone of the portable media device that is different than that of the first portion, and an acoustic port formed in the exterior surface of the body, the acoustic port being adapted to be coupled to a sound test tool, the body further having an internal cavity that acoustically couples the acoustic port to one of the acoustic aperture and the further acoustic aperture.

2. The device of claim 1 wherein the acoustic aperture is at a location, on the exterior surface, that is similar to that of a built-in earpiece in the first portion of the portable media device, and the acoustic port is adapted to be coupled to the output port of a reference sound source.

3. The device of claim 1 wherein the acoustic aperture is at a location, on the exterior surface, that is similar to that of a built-in microphone in the first portion of the portable media device, and the acoustic port is adapted to be coupled to the input port a sound pressure level meter.

4. The device of claim 1 wherein the acoustic aperture is at a location, on the exterior surface, that is similar to that of a built-in speaker in the first portion of the portable media device, and the acoustic port is adapted to be coupled to the output port of a reference sound source.

5. The device of claim 1 wherein the acoustic port is acoustically coupled by the internal cavity to both of said acoustic aperture and said further acoustic aperture.

6. The device of claim 1 wherein the body has a further acoustic port formed in the exterior surface of the body, the further acoustic port being adapted to be coupled to an acoustic input or output port of a sound test tool, the body having a further internal cavity that acoustically couples said further acoustic port to said further acoustic aperture.

7. The device of claim 1 wherein the body has a third portion, different than the first and second portions, whose exterior surface has shape and dimensions that are similar to those of the exterior surface of a third portion of the portable media device, wherein the exterior surface of the third portion of the portable media device has formed therein an acoustic aperture of a built-in earpiece, speaker, or microphone of the portable media device that is different than that of the first and second portions.

8. The device of claim 1 further comprising an acoustic resistance element incorporated in the acoustic port or in the internal cavity of the body.

9. The device of claim 1 further comprising a dummy connector, in the exterior surface of the body, that corresponds to an actual built-in communications connector of the media device.

10. A test fixture calibrator device comprising:

a body having a portion with a shape and dimensions similar to those of a cellular telephone handset, the body having an acoustic port formed in its exterior surface that is adapted to be coupled to an acoustic output port of a sound test tool, the body having an internal cavity that acoustically couples the acoustic port to an aperture in the exterior surface, wherein the aperture is positioned at a location, on the exterior surface of the body, that is similar to that of a built-in earpiece or speaker of the handset, and the acoustic port is adapted to be coupled to the output port of a reference sound source.

11. A test fixture calibrator device comprising:

a body having a portion with a shape and dimensions similar to those of a cellular telephone handset, the body having an acoustic port formed in its exterior surface that is adapted to be coupled to an acoustic input port of a sound test tool, the body having an internal cavity that acoustically couples the acoustic port to an aperture in the exterior surface, wherein the aperture is positioned at a location, on the exterior surface of the body, that is similar to that of a built-in microphone of the handset, and the acoustic port is adapted to be coupled to the input port of a sound pressure level meter.

* * * * *